(12) United States Patent
Kikuchi et al.

(10) Patent No.: US 6,981,535 B1
(45) Date of Patent: Jan. 3, 2006

(54) ELASTIC WHEEL

(75) Inventors: Hirohumi Kikuchi, Kawasaki (JP);
Katsumi Tashiro, Fuchu (JP);
Masanori Murase, Hidaka (JP);
Keiichiro Mizuno, Tokyo (JP)

(73) Assignees: Bridgestone Corporation, Tokyo (JP);
Topy Industries, Limited, Tokyo (JP)

( * ) Notice: Subject to any disclaimer, the term of this patent is extended or adjusted under 35 U.S.C. 154(b) by 0 days.

(21) Appl. No.: 10/048,651

(22) PCT Filed: Aug. 1, 2000

(86) PCT No.: PCT/JP00/05079

§ 371 (c)(1),
(2), (4) Date: Feb. 4, 2000

(87) PCT Pub. No.: WO01/08904

PCT Pub. Date: Feb. 8, 2001

(30) Foreign Application Priority Data

| Aug. 2, 1999 | (JP) | ................................ 11-219166 |
| Aug. 27, 1999 | (JP) | ................................ 11-240911 |
| Aug. 27, 1999 | (JP) | ................................ 11-240913 |
| Oct. 25, 1999 | (JP) | ................................ 11-302806 |
| Mar. 21, 2000 | (JP) | ................................ 11-079064 |

(51) Int. Cl.
*B60B 9/10* (2006.01)

(52) U.S. Cl. .......................... 152/47; 152/49; 152/292; 295/7; 295/11

(58) Field of Classification Search .................. 152/17, 152/42, 47, 48, 50, 31, 40, 49, 1; 295/1, 295/11, 7; 301/63.101
See application file for complete search history.

(56) References Cited

U.S. PATENT DOCUMENTS 1,343,684 A * 6/1920 Runyan ........................ 152/49

(Continued)

FOREIGN PATENT DOCUMENTS

DE          3 734 890 A1    4/1989

(Continued)

OTHER PUBLICATIONS

Microfilm of the specification and drawings annexed to the request of Japanese Utility Model Application No. 83881/1983 (Laid-Open No. 188701/1984), Fig. 3, Toyota Motor Corp., Dec. 14, 1984.

(Continued)

*Primary Examiner*—Frantz F. Jules
(74) *Attorney, Agent, or Firm*—Sughrue Mion, PLLC (57) ABSTRACT

An elastic wheel includes a disk (1) having a base rim (2), a rim (3) for supporting a tire (10), and an annular elastic rubber body (4) arranged between the outer peripheral surface of the base rim (2) and the inner peripheral surface of the rim (3). A gap is formed between the elastic rubber body (4) and the outer peripheral surface of the base rim (2) or the inner peripheral surface of the rim (3). The elastic rubber body (4) with the gap has a spring constant that shifts from a smaller value to a larger value as the input load increases, so that it absorbs vibration under small input conditions while being prevented from undergoing substantial deformation under large input conditions. The elastic wheel ensures riding comfortablesess performance and provides improved vibrationproof performance and soundproof performance, regardless of whether the input load is small or large, without sacrificing durability and safety. In terms of soundproof performance, provision of the gap is particularly effective in suppressing high-frequency noise of 100 Hz or higher.

12 Claims, 8 Drawing Sheets

U.S. PATENT DOCUMENTS

| | | | | |
|---|---|---|---|---|
| 1,377,354 A | * | 5/1921 | Kerrick | 152/25 |
| 1,396,984 A | * | 11/1921 | Willis | 152/47 |
| 1,427,995 A | * | 9/1922 | Allen | 152/47 |
| 2,049,374 A | * | 7/1936 | Harter | 295/11 |
| 2,609,856 A | | 9/1952 | Paton | |
| 2,870,813 A | | 1/1959 | Fawick | |
| 2,912,034 A | | 11/1959 | Mattern | |
| 4,917,166 A | * | 4/1990 | Iuchi | 152/554 |
| 5,131,445 A | * | 7/1992 | Tokieda et al. | 152/517 |

FOREIGN PATENT DOCUMENTS

JP 5-338401 A 12/1993

OTHER PUBLICATIONS

Microfilm of the specification and drawings annexed to the written application of Japanese Utility Model Application No. 53579/1976 (Laid-open No. 14450/1977) (Tetsuo Hinagata), Nov. 11, 1977.

* cited by examiner

ELASTIC WHEEL

This is a National Stage entry under 35 U.S.C. §371 of International Application No. PCT/JP00/05079 filed Aug. 1, 2000, the entire disclosure of which is incorporated herein by reference.

TECHNICAL FIELD

The present invention relates to elastic wheels to be used as wheels of vehicles, and more particularly to elastic wheels with excellent riding comfortableness performance, vibrationproof performance, and soundproof performance.

BACKGROUND ART

An elastic wheel typically comprises a disk to be fixed on an axle hub and a rim for supporting a tire, where a vibration proof body is provided between the disk and the rim. Various proposals have been put forth to provide the elastic wheel with improved vibration proof performance and riding comfortableness performance. As one of these proposals, a tire wheel is disclosed in Japanese Utility Model Laid-Open Publication No. Sho. 59-188701, in which a spring is used as a vibration proof body to improve the riding comfort.

Alternatively, an elastic wheel with a vibrationproof body made of rubber and arranged between a rim and a disk has been also proposed. For example, in Japanese Utility Model Laid-Open Publication No. Sho. 57-73203, there is proposed an elastic wheel in which a rim is connected to a disk via a rubber-like elastic body. Furthermore, Japanese Patent Laid-Open Publication No. Hei. 5-338401 discloses an elastic wheel where a clearance is created between a rim and an elastic wheel and a vibrationproof rubber is fitted into the clearance. In WO 9833666 official gazette, there is disclosed a wheel barrier assembly in which an annular rubber strip is arranged between a rim and an inner rim having the same profile as that of the rim.

However, in the conventional elastic wheels where rubbers are used as their vibrationproof bodies and are uniformly arranged between their rims and disks respectively, each of the rubber elastic body, which is cemented to the inner peripheral surface of the rim and the outer peripheral surface of the disk by means of vulcanization adhesion, is provided. Therefore, the rubber elastic body appropriately prevents each of vibrations transmitted from the rim to the disk in the axial direction, the radial direction, and the rotational direction, but there is a problem that it cannot prevent a displacement of the rubber elastic body under a heavy load. In other words, the cross sectional profile of the rubber is consistent, so that it is difficult to obtain appropriate vibrationproof characteristics with respect to each of cases from the small input to the large input. In this respect, there is the same problem when the spring is used as the vibrationproof body.

Furthermore, it has not been make clear the relationship between the rubber arranged between the rim and the disk and the soundproof performance, so that it is susceptible of improvement in terms of noise-proof.

Accordingly, an object of the present invention is to provide an elastic wheel with improvements in riding comfortableness performance, vibrationproof performance, and soundproof performance without impairment of the durability and the safety at any time of small input to large input.

DISCLOSURE OF THE INVENTION

The present inventors have devoted their efforts to solve the above problems while making full use of the characteristics of a rubber elastic body as a vibrationproof body. As a result, the present invention has completed because of their finding that the following configuration will attain the object of the present invention.

That is, the present invention provides an elastic wheel having a disk equipped with a base rim and a rim for supporting a tire, wherein an annular elastic rubber body is arranged between an outer peripheral surface of the base rim and an inner peripheral surface of the rim, and a gap is formed between the elastic rubber body and the outer peripheral surface of the base rim or the inner peripheral surface of the rim. The present invention also provides an elastic wheel having a disk equipped with a base rim and a rim for supporting a tire, wherein an elasticity-providing device is inserted between an outer peripheral surface of the base rim and an inner peripheral surface of the rim. The elasticity-providing device includes two concentrically arranged annular members with different diameters and an elastic rubber body arranged between an outer peripheral surface of the inner annular member and an inner peripheral surface of the outer annular member. In this manner, a gap is formed between the elastic rubber body and the outer peripheral surface of the inner annular member or the inner peripheral surface of the outer annular member.

In these aspects of the present invention, the elastic rubber body with the gap formed therein has the spring constant that shifts from a smaller value to a larger value as the input load increases. Therefore, the elastic rubber body can absorb vibration under small input conditions while being prevented from undergoing significant deformation under large input load conditions. Consequently, the elastic wheel according to these aspects helps improve riding comfortablesess performance, vibrationproof performance and soundproof performance, regardless of whether the input load is small or large, without sacrificing durability and safety. In terms of soundproof performance, the presence of the gap is particularly effective in suppressing high-frequency noises of 100 Hz or higher.

In this regard, the gap preferably accounts for 5 to 80% of a space accommodating the elastic rubber body in the cross-section of the elastic rubber body taken in the axle direction of the wheel. In this manner, the above-described effect is further ensured.

In a further aspect, the present invention provides an elastic wheel having a disk equipped with a base rim and a rim for supporting a tire, wherein at least two annular elastic rubber bodies are arranged between an outer peripheral surface of the base rim and an inner peripheral surface of the rim. The present invention also provides an elastic wheel having a disk equipped with a base rim and a rim for supporting a tire, wherein an elasticity-providing device is inserted between an outer peripheral surface of the base rim and an inner peripheral surface of the rim. The elasticity-providing device includes two concentrically arranged annular members with different diameters and at least two elastic rubber bodies arranged between an outer peripheral surface of the inner annular member and an inner peripheral surface of the outer annular member.

In these aspects of the present invention, the space between the elastic rubber bodies acts in the same the way that the above-described gap acts and also helps improve riding comfortablesess performance, vibrationproof performance and soundproof performance, regardless of whether the input load is small or large. In terms of soundproof performance, these embodiments are particularly effective in suppressing high-frequency noises of 100 Hz or higher.

In such an elastic wheel, it is preferred that the elastic rubber bodies, in its cross-section taken along the axle direction of the wheel, have a width that gradually varies from the outer peripheral surface of the base rim toward the inner peripheral surface of the rim. In this manner, the above-described effect is effectively achieved regardless of whether the input load is small or large.

In a still further aspect, the present invention provides an elastic wheel having a disk equipped with a base rim and a rim for supporting a tire, wherein a single annular elastic rubber body is arranged between an outer peripheral surface of the base rim and an inner peripheral surface of the rim at a substantially central region in the axle direction, and the elastic rubber body, in its cross-section taken along the axle direction of the wheel, has a width that gradually varies from the outer peripheral surface of the base rim toward the inner peripheral surface of the rim. The present invention also provides an elastic wheel having a disk equipped with a base rim and a rim for supporting a tire, wherein an elasticity-providing device is inserted between an outer peripheral surface of the base rim and an inner peripheral surface of the rim. The elasticity-providing device includes two concentrically arranged annular members with different diameters and a single annular elastic body arranged between an outer peripheral surface of the inner annular member and an inner peripheral surface of the outer annular member, with the elastic rubber body, in its cross-section taken along the axle direction of the wheel, having a width that gradually varies from the outer peripheral surface of the base rim toward the inner peripheral surface of the rim.

These aspects of the present invention also help achieve the above-described effect, regardless of whether the input load is small or large. Moreover, provision of the elasticity-providing device facilitates the production of the elastic wheel.

In a still further aspect, the present invention provides an elastic wheel having a disk equipped with a base rim and a rim for supporting a tire, wherein an annular elastic rubber body is arranged between an outer peripheral surface of the base rim and an inner peripheral surface of the rim on one side of the wheel in the wheel axle direction, and an annular support member is arranged on the other side of the wheel. The present invention further provides an elastic wheel having a disk equipped with a base rim and a rim for supporting a tire, wherein an elasticity-providing device is arranged between an outer peripheral surface of the base rim and an inner peripheral surface of the rim. The elasticity-providing device includes two concentrically arranged annular members with different diameters and an elastic rubber body arranged between an outer peripheral surface of the inner annular member and an inner peripheral surface of the outer annular member on one side of the wheel in the wheel axle direction and an annular support member arranged on the other side of the wheel.

In these aspects of the present invention, the elastic rubber body effectively prevents the vibrations in the axle direction, in the radial direction, and in the direction of rotation, from being transmitted from the rim to the disk. Further, the support member acts to prevent the elastic rubber body from undergoing displacement under large load conditions. It also acts to prevent the separation of the rim from the disk. Consequently, the elastic wheel according to these aspects helps improve riding comfortablesess performance, vibrationproof performance and soundproof performance, regardless of whether the input load is small or large, without sacrificing durability and safety.

In this regard, it is preferred that the elastic rubber body, in its cross-section taken along the axle direction of the wheel, have a width that gradually varies from the outer peripheral surface of the base rim toward the inner peripheral surface of the rim. In this manner, not only is the above-described effect achieved, but the spring constant of the elastic rubber body also shifts from a smaller value to a larger value as the input load increases, such that the elastic rubber body can absorb vibration under small input load conditions while being prevented from undergoing significant deformation under large input load conditions. Consequently, the elastic wheel according to this embodiment helps improve riding comfortablesess performance, vibrationproof performance and soundproof performance, regardless of whether the input load is small or large, without sacrificing durability and safety. In terms of soundproof performance, this embodiment is particularly effective in suppressing high-frequency noises of 100 Hz or higher.

In a still further aspect, the present invention provides an elastic wheel having a disk equipped with a base rim, a rim for supporting a tire, and an annular elastic rubber body arranged between an outer peripheral surface of the base rim and an inner peripheral surface of the rim, wherein an engagement mechanism is provided on the outer peripheral surface of the base rim and on the inner peripheral surface of the rim, to engage with each other. The present invention further provides an elastic wheel having a disk equipped with a base rim, a rim for supporting a tire, and two annular elastic rubber bodies arranged between an outer peripheral surface of the base rim and an inner peripheral surface of the rim, and is characterized in that an engagement mechanism is provided between the two elastic rubber bodies, on the outer peripheral surface of the base rim and on the inner peripheral surface of the rim, to engage with each other.

In these aspects of the present invention, the features of the elastic rubber bodies not only help prevent vibrations in the radial direction as well as in the direction of rotation but also help prevent the elastic rubber bodies from undergoing significant deformation under large load conditions, so that the braking force and the traction are transmitted from the disk to the rim even when the elastic rubber bodies have collapsed. In particular, provision of the two elastic rubber bodies causes the spring constant of the elastic rubber bodies to shift from a smaller value to a larger value as the input load increases, such that the elastic rubber bodies can absorb vibration under small input load conditions while being prevented from undergoing significant deformation under large input load conditions. In terms of soundproof performance, this embodiment is particularly effective in suppressing high-frequency noises of 100 Hz or higher.

In this regard, it is preferred that the engagement mechanism includes rows of teeth arranged on the outer peripheral surface of the base rim and on the inner peripheral surface of the rim, respectively, so that the rows of teeth engage with each other. Alternatively, the engagement mechanism may include a row of teeth arranged on the inner peripheral surface of the rim and a row of openings provided on the base rim so that the row of teeth engages with the row of openings. These embodiments ensure the engagement of the rim with the disk so that the braking force and the traction are transmitted from the disk to the rim.

In a still further aspect, the present invention provides an elastic wheel having a disk secured to an axle hub and a rim for supporting a tire, wherein an annular ridge having a semi-circular cross-section along the wheel axle direction is formed on the rim, and a corresponding annular ridge having a semi-circular cross-section is formed on an outer peripheral surface of the disk. An annular elastic rubber body is arranged between an inner peripheral surface of the ridge on the rim and an outer peripheral surface of the ridge on the disk to join the disk to the rim. The present invention further provides an elastic wheel having a disk secured to an axle hub and a rim for supporting a tire, wherein an annular groove having a semi-circular cross-section along the wheel axle direction is formed on the rim, and a corresponding annular groove having a semi-circular cross-section is formed on an outer peripheral surface of the disk. An annular elastic rubber body is arranged between an inner peripheral surface of the groove on the rim and an outer peripheral surface of the groove on the disk to join the disk to the rim.

In these aspects of the present invention, the arrangement of the elastic rubber bodies effectively absorbs vibration and helps improve riding comfortablesess performance, vibrationproof performance and soundproof performance.

In this regard, it is preferred that the joint be configured to have a waved shape in the circumferential direction of the wheel. This construction is particularly advantageous in terms of safety since it ensures the mechanical safety of the wheel in the circumferential direction of the wheel, as well as in the radial direction and in the axle direction, even when the elastic rubber body has collapsed because of an excessive input load.

In a still further aspect, the present invention provides an elastic wheel having a disk secured to an axle hub and a rim for supporting a tire and is characterized in that a series of semi-spherical projections are formed, in a spaced-apart manner, on the rim along the circumferential direction, and a corresponding series of semi-spherical projections are formed on the disk along the circumferential direction. An elastic rubber body is arranged between an inner peripheral surface of each semi-spherical projection on the rim and an outer peripheral surface of each semi-spherical projection on the disk to join the disk to the rim. The present invention further provides an elastic wheel having a disk secured to an axle hub and a rim for supporting a tire, wherein a series of semi-spherical recesses are formed, in a spaced-apart manner, on the rim in the circumferential direction, and a corresponding series of semi-spherical recesses are formed on the disk in the circumferential direction. An elastic rubber body is arranged between an inner peripheral surface of each semi-spherical recess on the rim and an outer peripheral surface of each semi-spherical recess on the disk to join the disk to the rim.

These aspects of the present invention are particularly advantageous in terms of safety, since the arrangement of the elastic rubber bodies absorbs vibration and helps improve riding comfortablesess performance, vibrationproof performance and soundproof performance. These aspects also ensure the mechanical safety of the wheel in the circumferential direction of the wheel, as well as in the radial direction and in the axle direction, even when the elastic rubber body has collapsed because of an excessive input.

BEST MODES FOR CARRYING OUT THE INVENTION

The present invention will now be described with reference to preferred embodiments.

Figure 1:
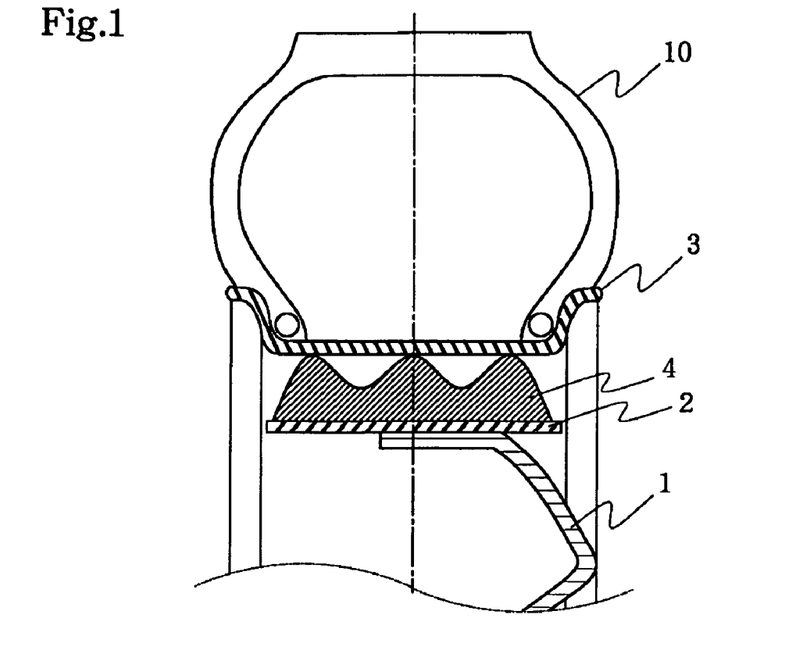
FIG. 1 is an enlarged partial cross-sectional view of one embodiment of an elastic wheel of the present invention.

Referring to FIG. 1, one preferred embodiment of an elastic wheel of the present invention includes a disk 1, which has a base rim 2 and is secured to an axle hub (not shown). Such a wheel may be provided by integrally forming the disk 1 with the base rim 2, or it may be a spoke wheel or a mesh wheel including supporting members such as spokes, mesh, or the like. While the disk 1 may be made of any material such as steel, aluminum, magnesium and synthetic resin, it is preferably made of aluminum or synthetic resin when it is desired to construct a light weight disk. An annular elastic rubber body 4 of the present invention is arranged between an outer peripheral surface of the base rim 2 and an inner peripheral surface of a rim 3 for supporting a tire 10. The construction of the rim 3 is not limited to a specific type and can properly be selected depending on its application. For example, it may be of a standard type or one with different diameters at both sides. The elastic rubber body 4 is attached to both the inner peripheral surface of the rim 3 and the outer peripheral surface of the base rim 2 using an adhesion technique such as vulcanization.

Figure 2:
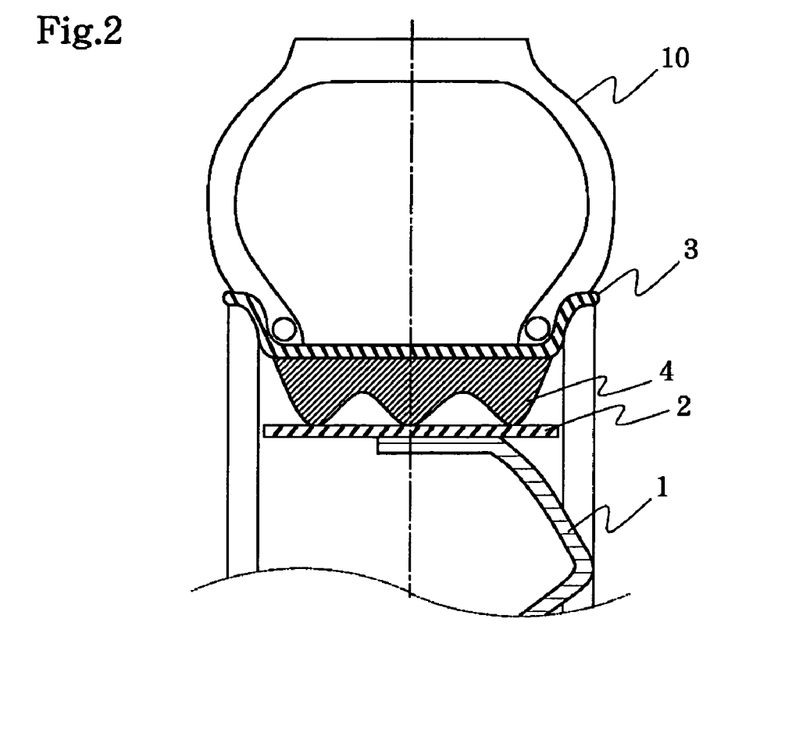
FIG. 2 is an enlarged partial cross-sectional view showing another embodiment of the elastic wheel of the present invention.

The elastic rubber body 4 is preferably formed to have a cross-sectional shape in the wheel axle direction that is corrugated or trapezoidal either on the side attached to the inner peripheral surface of the rim 3 as shown in FIG. 1 or on the side attached to the outer peripheral surface of the base rim 2 as shown in FIG. 2. In this manner, annular gaps, each of which extends in a circumferential direction, are formed between the elastic rubber body 4 and the inner peripheral surface of the rim 3 or the outer peripheral surface of the base rim 2. The gaps account for 5 to 80%, preferably 10 to 70%, and more preferably 10 to 50%, of the space accommodating the elastic rubber body. While each ridge of the corrugation is attached to the inner peripheral surface of the rim 3 or to the outer peripheral surface of the base rim 2 in the embodiments shown, the attachment may be accomplished using only some of the ridges, for example, the outermost ridges. In this manner, middle ridges can function more effectively when the input load is large. The spring constant of the elastic rubber body with gaps shifts from a smaller value to a larger value as the input load increases. As a result, the elastic rubber body absorbs vibration under small input load conditions while being prevented from undergoing significant deformation under large input load conditions. The above-described gaps also help reduce stress concentration in the rubber. The shift in the spring constant can be controlled by properly selecting the proportion of the gaps in the space accommodating the elastic rubber body and geometry of the gaps.

Figure 3:
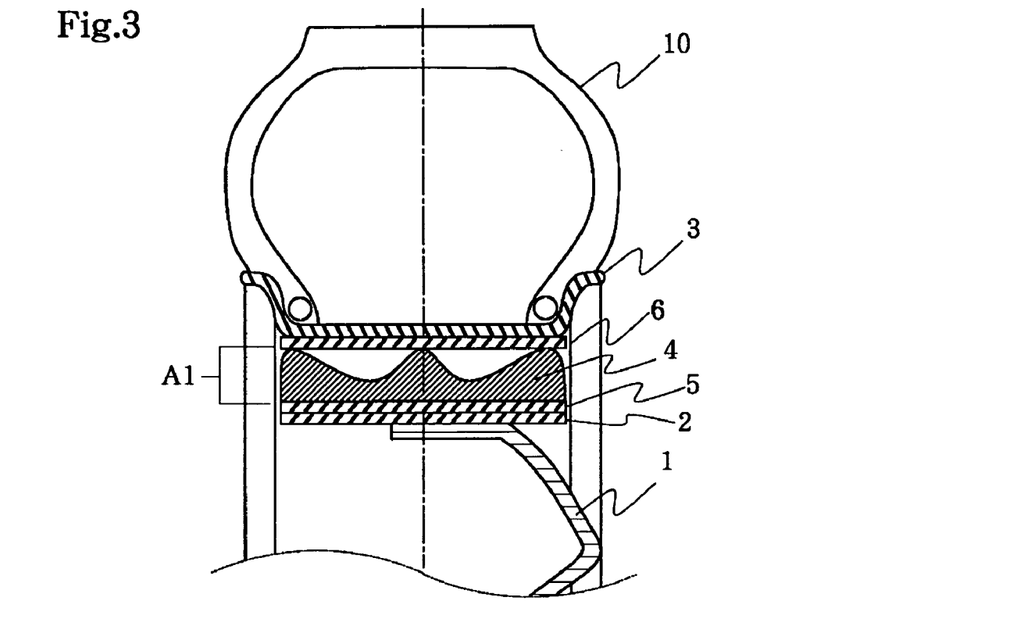
FIG. 3 is an enlarged partial cross-sectional view showing still another embodiment of the elastic wheel of the present invention.

While the annular elastic rubber body 4 is directly arranged between the outer peripheral surface of the base rim 2 and the inner peripheral surface of the rim 3 in the preferred embodiments shown in FIGS. 1 and 2, an elasticity-providing device A1 with similar functionality may be arranged between the outer peripheral surface of the base rim 2 and the inner peripheral surface of the rim 3 as shown in FIG. 3. The elasticity-providing device A1 is secured between the base rim 2 and the rim 3 by, for example, welding and includes two concentrically arranged annular members with different diameters, namely, an inner annular member 5 and an outer annular member 6, and an annular elastic rubber body 4 arranged between the outer peripheral surface of the inner annular member 5 and the inner peripheral surface of the outer annular member 6. In this manner, gaps similar to those described above are formed between the elastic rubber body 4 and the outer peripheral surface of the inner annular member 5 or the inner peripheral surface of the outer annular member 6. The elasticity-providing device A1 facilitates manufacture of the elastic wheel.

The elastic rubber body for use in the present invention may be any conventional rubber body that has anti-vibration property and may be prepared by properly blending additives such as sulfur, a rubber accelerator, an anti-aging agent and carbon black in natural or synthetic rubber such as diene rubber including butadiene rubber, styrene-butadiene copolymer rubber and butyl rubber. The elastic rubber body preferably has a JIS-A hardness (Hd) of 30 to 80° and an elasticity modulus of $1\times10^3$ to $1\times10^5 N/cm^2$ in view of vibration-absorbability and durability.

Figure 4:
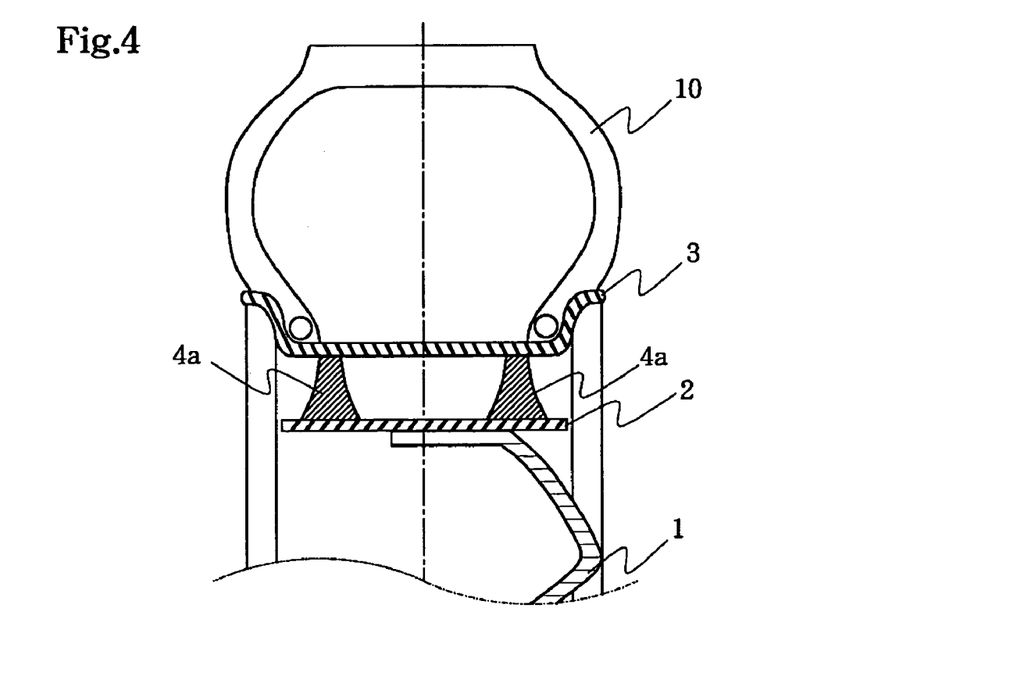
FIG. 4 is an enlarged partial cross-sectional view showing still another embodiment of the elastic wheel of the present invention.
Figure 5:
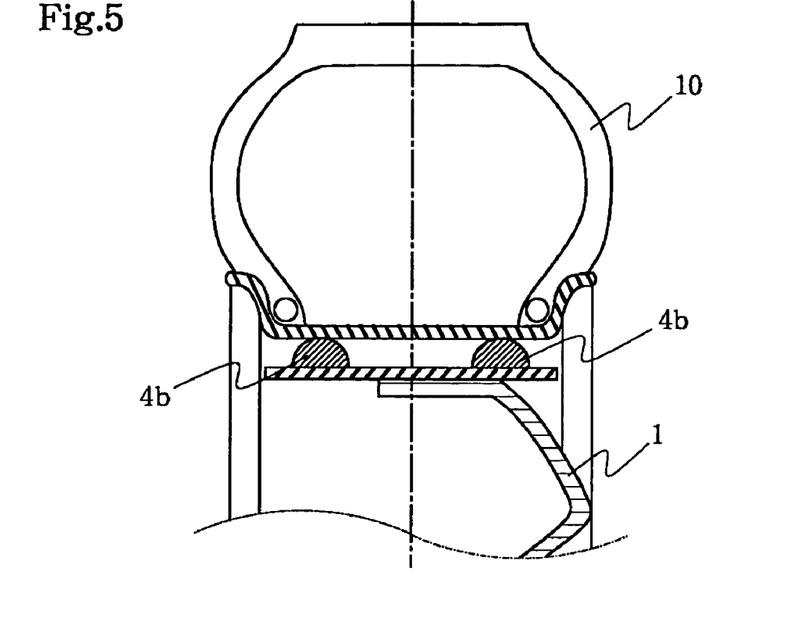
FIG. 5 is an enlarged partial cross-sectional view showing still another embodiment of the elastic wheel of the present invention.

The distance between the base rim 2 and the rim 3 is preferably from 5 to 30 mm in view of driving stability and vibration-absorbability although it may be varied depending on the shape and the rim size of the annular elastic rubber body. Referring now to FIG. 4, another preferred embodiment of the elastic wheel of the present invention is shown. In this embodiment in FIG. 4, a pair of annular elastic rubber bodies 4a are arranged between the outer peripheral surface of the base rim 2 and the inner peripheral surface of the rim 3 and are attached to the respective surfaces using an adhesion technique such as vulcanization. The space defined between the elastic rubber bodies 2 has the same function as the gaps described above. As shown, the width of the elastic rubber body 4a, in its cross-section taken along the axle direction, gradually decreases from the outer peripheral surface of the base rim 2 toward the inner peripheral surface of the rim 3. While the width decreases in a curved fashion in this embodiment, it may be decreased in a differently curved fashion as represented by an elastic rubber body 4b in FIG. 5, which is shown in a cross-section taken along the wheel axle direction.

Similarly, the width of the elastic rubber body 4a, in its cross-section taken along the axle direction of the wheel, may be gradually increased from the outer peripheral surface of the base rim 2 toward the inner peripheral surface of the rim 3. These constructions allow the spring constant of the elastic rubber body to shift more smoothly from a smaller value to a larger value as the input load increases.

Figure 6:
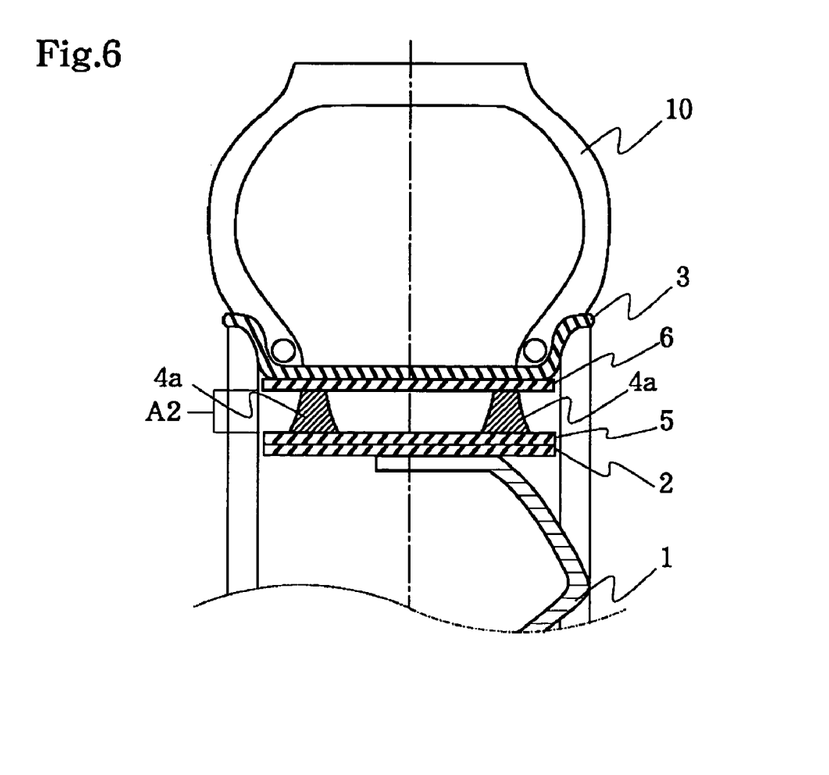
FIG. 6 is an enlarged partial cross-sectional view showing still another embodiment of the elastic wheel of the present invention.

Alternatively, an elasticity-providing device A2 with similar functionality may be arranged between the outer peripheral surface of the base rim 2 and the inner peripheral surface of the rim 3 as shown in FIG. 6. As in the case of the preferred embodiment shown in FIG. 3, the elasticity-providing device A2 includes two concentrically arranged annular members with different diameters, the inner annular member 5 and the outer annular member 6, and a pair of annular elastic rubber bodies 4a arranged between the outer peripheral surface of the inner annular member 5 and the inner peripheral surface of the outer annular member 6.

Figure 7:
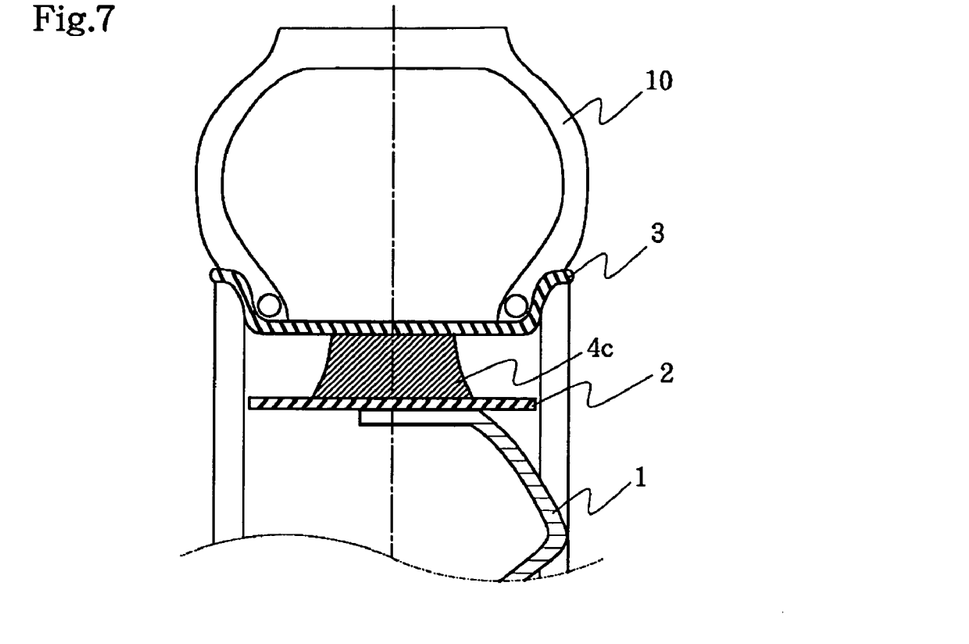
FIG. 7 is an enlarged partial cross-sectional view showing still another embodiment of the elastic wheel of the present invention.

Referring now to FIG. 7, still another embodiment of the elastic wheel the present invention is shown. In this embodiment in FIG. 7, no gap or space is formed by the elastic rubber body: a single annular elastic rubber body 4c is arranged between the outer peripheral surface of the base rim 2 and the inner peripheral surface of the rim 3 at a central region along the axle direction and is attached to the respective surfaces by vulcanization. By gradually decreasing or increasing (not shown) the width of the elastic rubber body 4c, in its cross-section taken along the axle direction, in a direction from the outer peripheral surface of the base rim 2 toward the inner peripheral surface of the rim 3, the spring constant of the elastic rubber body 4c can be shifted from a small value to a large value in response to an increase in the input load.

Alternatively, an elasticity-providing device (not shown) with similar functionality may be arranged between the outer peripheral surface of the base rim 2 and the inner peripheral surface of the rim 3. The elasticity-providing device includes two concentrically arranged annular members with different diameters, the inner annular member and the outer annular member, and a single annular elastic rubber body, which is arranged between the outer peripheral surface of the inner annular member and the inner peripheral surface of the outer annular member at a substantially central region along the axle direction, with the width of the elastic rubber body, in its cross-section taken along the axle direction of the wheel, gradually varied from the outer peripheral surface of the base rim toward the inner peripheral surface of the rim.

Figure 8:
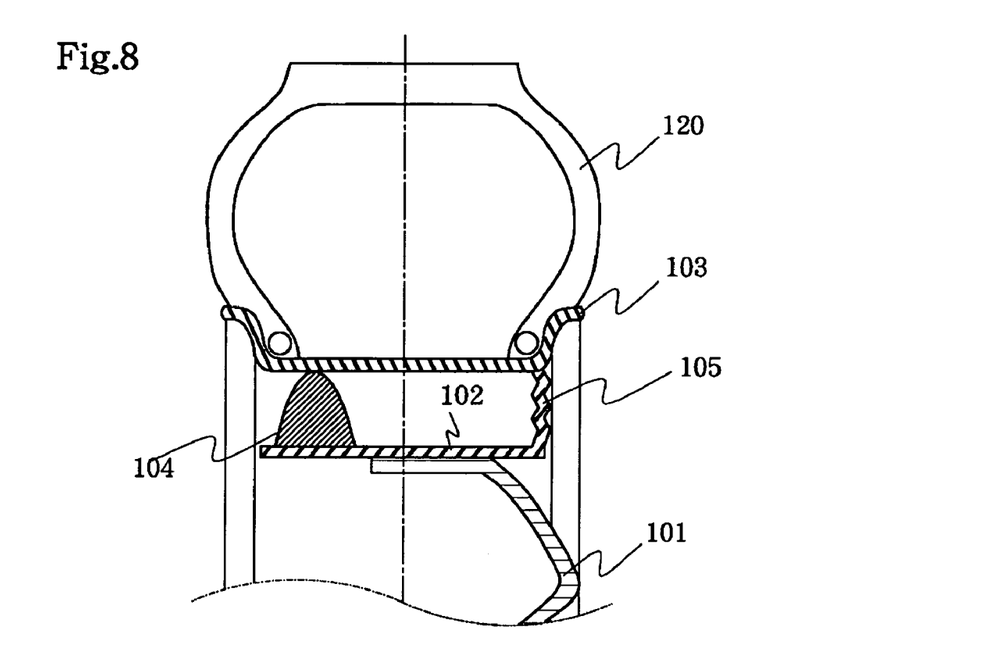
FIG. 8 is an enlarged partial cross-sectional view showing still another embodiment of the elastic wheel of the present invention.

Referring to FIG. 8, still another embodiment of the elastic wheel of the present invention is shown which includes a disk 101, which has a base rim 102 and is secured to an axle hub (not shown). The base rim 102 in this case may also be integrally formed with the disk 101. An annular elastic rubber body 104 is arranged between the outer peripheral surface of the base rim 102 and the inner peripheral surface of a rim 103 for supporting a tire 120 on one side of the wheel along the wheel axle direction. The elastic rubber body 104 is attached to both the inner peripheral surface of the rim 103 and the outer peripheral surface of the base rim 102 by using an adhesive technique such as vulcanization. As shown, the width of the elastic rubber body 104, in its cross-section taken along the wheel axle direction, gradually decreases from the outer peripheral surface of the base rim 102 toward the inner peripheral surface of the rim 103. In this manner, the spring constant of the elastic rubber body shifts from a smaller value to a larger value as the input load increases. As a result, the elastic rubber body can effectively absorb vibration under small input load conditions while being prevented from undergoing significant deformation under large input load conditions. While the width of the elastic rubber body 104, in its cross-section taken along the wheel axle direction, gradually decreases from the outer peripheral surface of the base rim 102 to the inner peripheral surface of the rim 103 in the embodiment shown in FIG. 8, the same effect is obtained with the rubber body having a gradually increasing width. The width may be varied either in a linear fashion as shown in FIG. 8 or in a curved fashion.

An annular support member 105 is arranged between the outer peripheral surface of the base rim 102 and the inner peripheral surface of the rim 103 on the other side of the wheel across the equatorial plane of the tire in the wheel axle direction. The support member 105 may be secured to both the outer peripheral surface of the base rim 102 and the inner peripheral surface of the rim 103 by, for example, welding, or it may be integrally formed with the base rim 102.

As shown in FIG. 8, the support member 105 may be formed to have a zigzag-shaped cross-section so that it can serve as a spring in a tire radial direction to effectively absorb vibration. In this manner, riding comfortablesess performance, vibrationproof performance and soundproof performance are each improved regardless of whether the input load is small or large.

Figure 9:
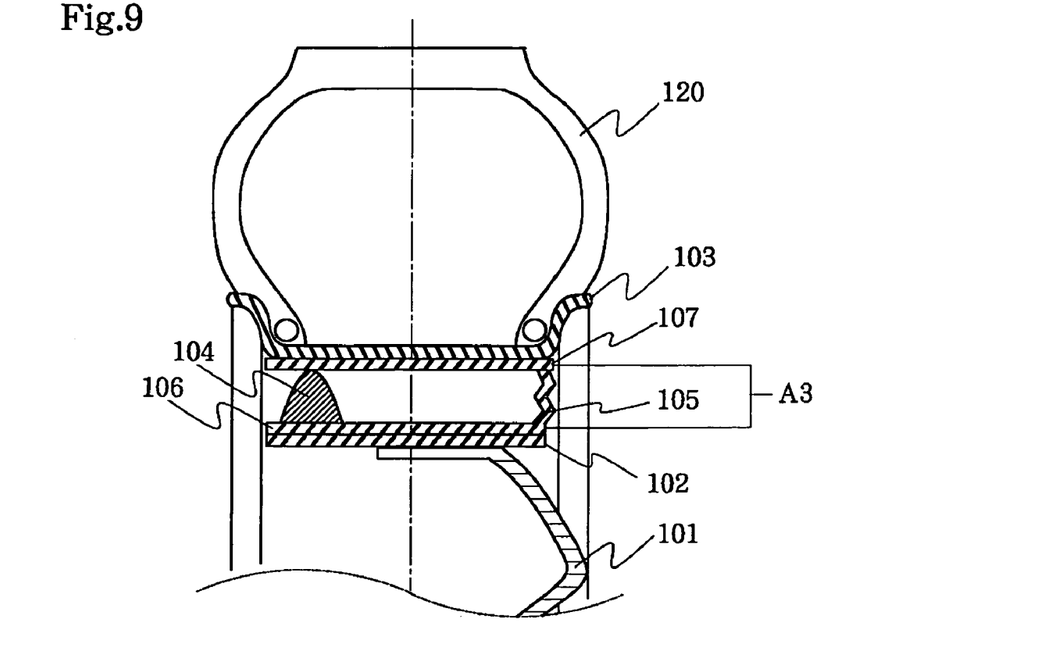
FIG. 9 is an enlarged partial cross-sectional view showing still another embodiment of the elastic wheel of the present invention.

While the annular elastic rubber body 104 and the annular support member 105 are directly arranged between the outer peripheral surface of the base rim 102 and the inner peripheral surface of the rim 103 in the preferred embodiment shown in FIG. 8, an elasticity-providing device A3 with similar functionality may be arranged between the outer peripheral surface of the base rim 102 and the inner peripheral surface of the rim 103 as shown in FIG. 9. The elasticity-providing device A3 includes two concentrically arranged annular members with different diameters, namely, an inner annular member 106 and an outer annular member 107, and an annular elastic rubber body 104 and a support member 105, each of which is arranged between the outer peripheral surface of the inner annular member 106 and the inner peripheral surface of the outer annular member 107 with the elastic rubber body 104 arranged on one side of the wheel in the wheel axle direction and the support member 105 on the other side of the wheel. The inner annular body 106, the outer annular body 107 and the support member 105 may be formed integrally with each other.

Figure 10:
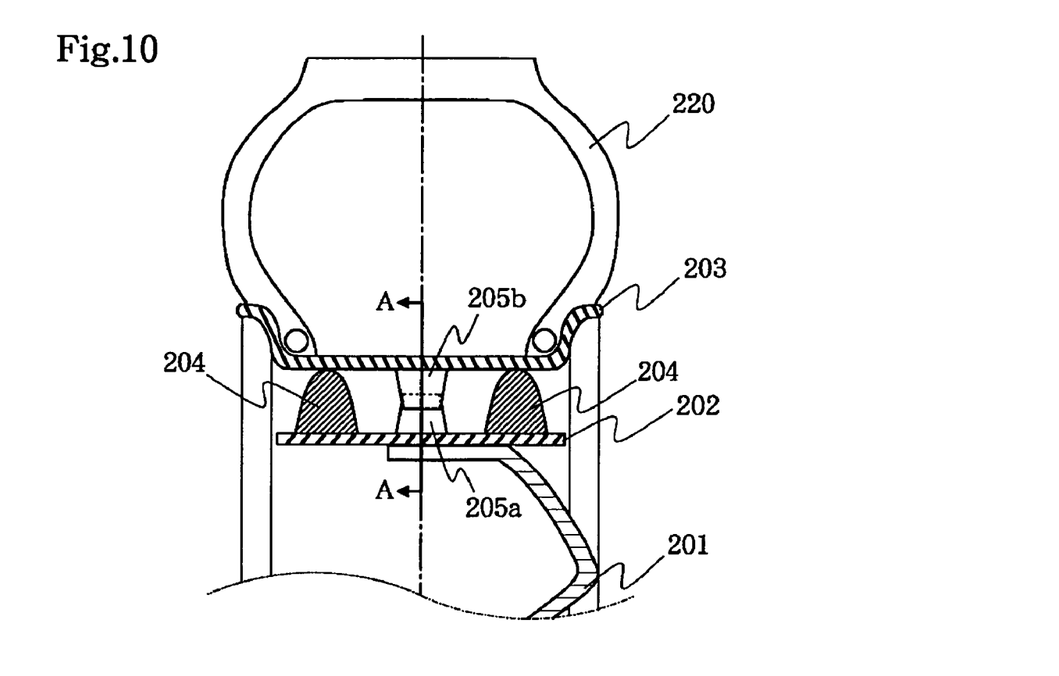
FIG. 10 is an enlarged partial cross-sectional view showing still another embodiment of the elastic wheel of the present invention.

Referring to FIG. 10, still another embodiment of the elastic wheel of the present invention is shown which includes a disk 201, which has a base rim 202 and is secured to an axle hub (not shown). The base rim 202 in this case may also be integrally formed with the disk 201. A pair of annular elastic rubber bodies 204 are arranged between the outer peripheral surface of the base rim 202 and the inner peripheral surface of a rim 203 for supporting a tire 220 and are attached to the respective surfaces by using an adhesive technique such as vulcanization. The spring constant of the elastic rubber bodies 204 shifts from a smaller value to a larger value as the input load increases, so that the elastic rubber body can absorb vibration under small input load conditions while being prevented from undergoing significant deformation under large input load conditions. The width of the elastic rubber body 204, in its cross-section taken along the axle direction, gradually varies from the outer peripheral surface of the base rim 202 toward the inner peripheral surface of the rim 203, so that the spring constant of the elastic rubber body can shift more smoothly from a smaller value to a larger value as the input load increases.

Figure 11:
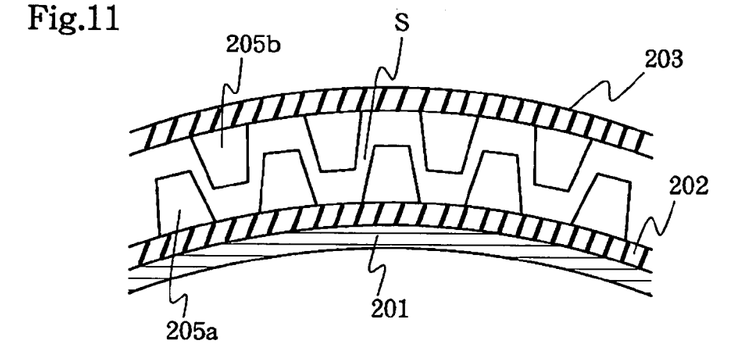
FIG. 11 is a cross-sectional view taken along a line A—A in FIG. 10.

In addition to the elastic rubber bodies 204 for serving as an anti-vibration member, this embodiment includes an engagement mechanism provided on the outer peripheral surface of the base rim 202 and on the inner peripheral surface of the rim 203. The engagement mechanism in FIG. 10 comprises rows of teeth 205*a* and 205*b* arranged on the outer peripheral surface of the base rim 202 and on the inner peripheral surface of the rim 203, respectively. As best seen in FIG. 11 that shows a cross-section in the circumferential direction taken along the line A—A in FIG. 10, the rows of teeth 205*a* and 205*b* come into engagement to transmit the braking force and the traction from the disk to the rim even when the elastic rubber bodies have collapsed because of an excessive input load. This ensures the driving safety. A gap S between the rows of teeth 205*a* and 205*b* is maintained to a degree that does not hinder the anti-vibration function of the elastic rubber body and is properly determined depending on the type of the tire.

Figure 12:
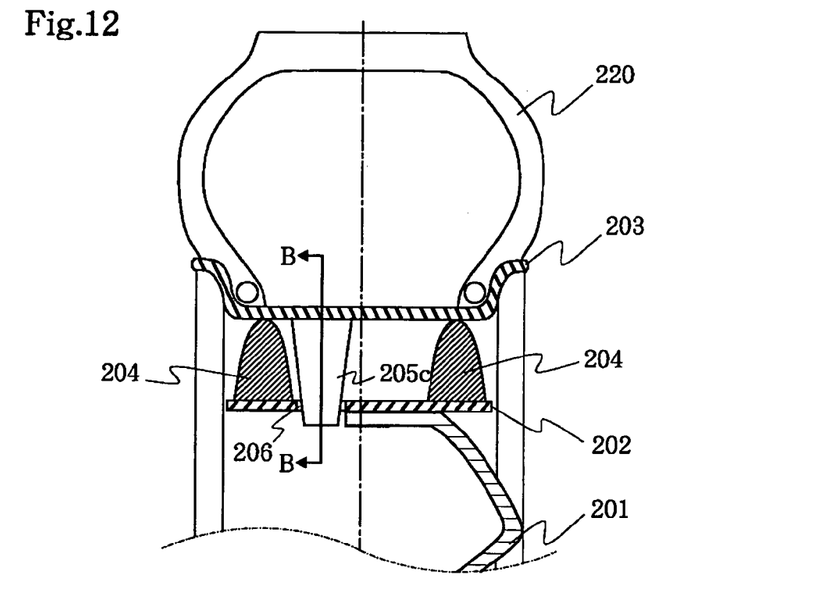
FIG. 12 is an enlarged partial cross-sectional view showing still another embodiment of the elastic wheel of the present invention.
Figure 13:
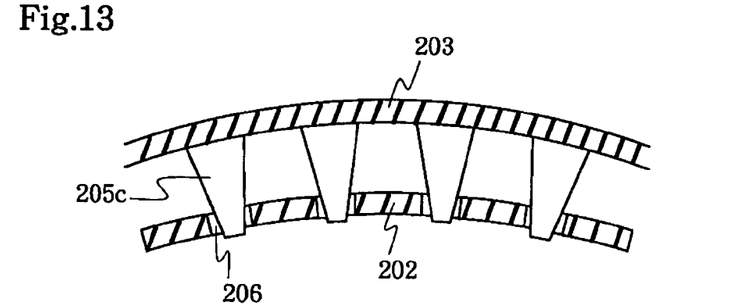
FIG. 13 is a cross-sectional view taken along a line B—B in FIG. 12.

The same effect is obtained by substituting the above-described engagement mechanism with another engagement mechanism in accordance with another embodiment of the elastic wheel of the present invention as shown in FIG. 12. As best seen in FIG. 13 that shows a cross-section in the circumferential direction taken along the line B—B in FIG. 12, this engagement mechanism includes a row of teeth 205*c*, which are arranged on the inner peripheral surface of the rim and engage with a row of openings 206 provided on the base rim 202.

Aside from those described above, various other constructions of the engagement mechanism are conceived of and are placed at various other locations. The construction and the location of placement, therefore, are to be suitably selected depending on the shape of the elastic rubber body and where it is applied in order to fully exploit the anti-vibration property of the elastic rubber body. However, it is essential that the base rim 202 comes into engagement with the rim 203 via the engagement mechanism to transmit the braking force as well as the traction from the disk to the rim even when the elastic rubber body has collapsed.

Figure 14:
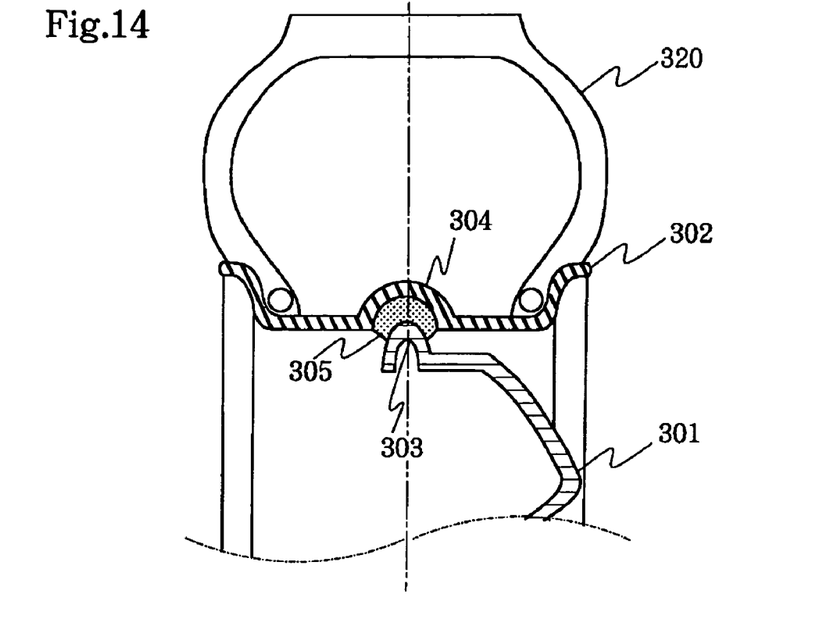
FIG. 14 is an enlarged partial cross-sectional view showing still another embodiment of the elastic wheel of the present invention.

Referring now to FIG. 14, another embodiment of the elastic wheel of the present invention is shown which includes a disk 301 secured to an axle hub (not shown) and a rim 302 for supporting a tire 320. An annular ridge 304 having a semi-circular cross-section in the wheel axle direction is formed on the rim 302 at a substantially central region in the same direction. An annular ridge 303, which has a semi-circular cross-section that corresponds to the annular ridge 304, is formed on the outer peripheral surface of the disk 301 at a position that corresponds to the annular ridge 304. An annular elastic rubber body 305 is arranged between the inner peripheral surface of the ridge 304 and the outer peripheral surface of the ridge 303 to join the disk 301 to the rim 302. Attachment of the elastic rubber body 305 to the disk 301 and to the rim 302 is accomplished by vulcanization or by using an adhesive. The curvatures of the ridges 303 and 304 may properly be selected depending on the size of the tire. Within the safety range, the thickness of the elastic rubber body 305 in the radial direction is also properly selected depending on the type of the tire in order to elicit maximal effects. As can be appreciated, these parameters are not limited to specific values.

Figure 15:
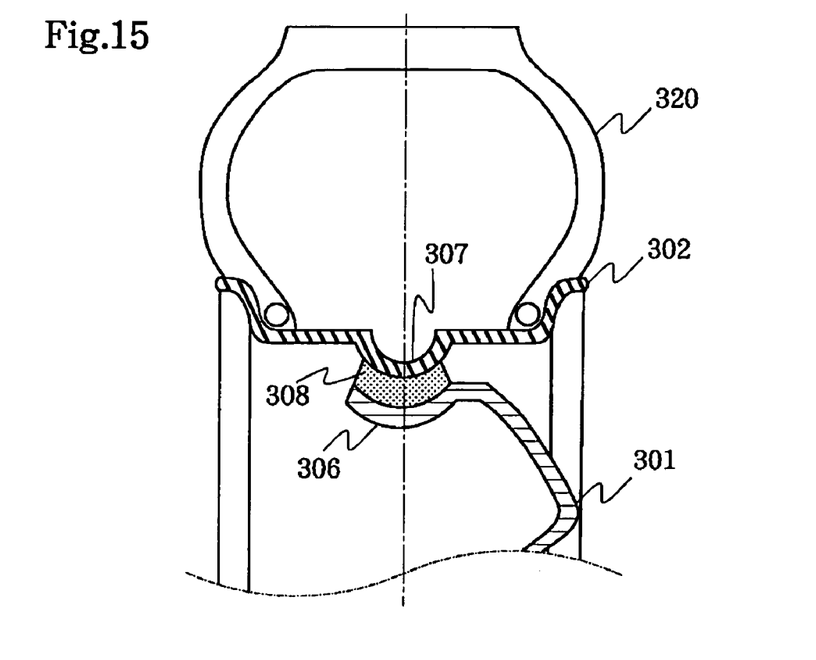
FIG. 15 is an enlarged partial cross-sectional view showing still another embodiment of the elastic wheel of the present invention.

Referring now to FIG. 15, another embodiment of the elastic wheel of the present invention is shown in which an annular groove 307 having a semi-circular cross-section in the wheel axle direction is formed on the rim 302 at a substantially central region in the same direction, whereas an annular groove 306 with a semi-circular cross-section that corresponds to the groove 307 is formed on the outer peripheral surface of the disk 301 at a position corresponding to the groove 307. As in the case of above-described embodiment, an annular elastic rubber body 308 is arranged between the inner peripheral surface of the groove 307 and the outer peripheral surface of the groove 306 to join the disk 301 to the rim 302.

Figure 16:
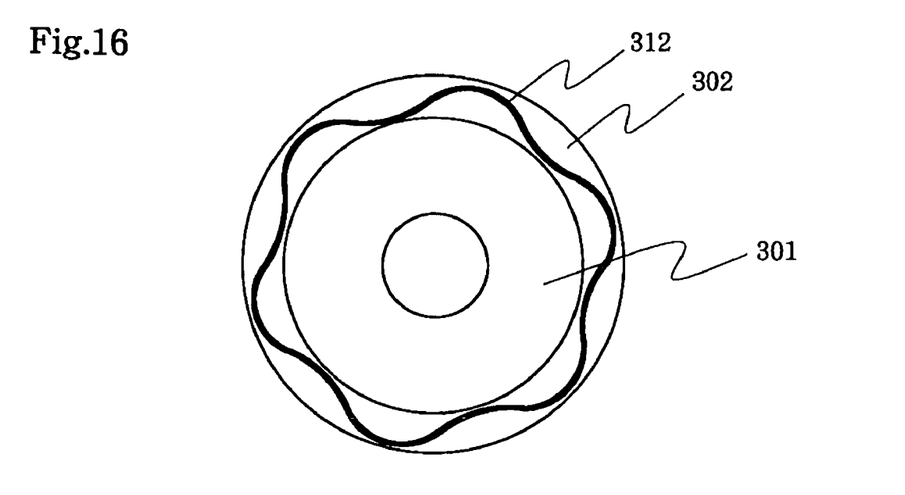
FIG. 16 is a cross-sectional view taken along a plane including a circumference of one embodiment of the wheel of the present invention, showing a joint between a disk and a rim.

In the embodiments shown in FIGS. 14 and 15, it is preferred that the joint between the disk 301 and the rim 302 be formed in a waved fashion in the circumferential direction of the wheel. In particular, the joint 312 is configured to have a waved shape as shown in FIG. 16 in the cross-sectional view of the elastic wheel taken along the circumferential direction. In this manner, the disk 301 and the rim 302 are prevented from sliding relative to one another upon braking when the elastic rubber body in the joint 312 has collapsed because of an excessive input load. This ensures the safety.

While the annular joint between the disk 301 and the rim 302 is continuously formed in each of the embodiments shown in FIGS. 14 and 15, it may be formed in a discontinuous manner in the circumferential direction as described in the following embodiments of the present invention.

In an embodiment of this type, the wheel has the same construction as the one shown in FIG. 14 when viewed in the cross-section taken along the axle direction of the wheel. The embodiment is different from the previous one in that a series of semi-spherical projections 304 are formed on the rim 302 in the circumferential direction in a spaced-apart manner, and a series of semi-spherical projections 303 having a shape corresponding to the semi-spherical projection 304 are formed on the outer peripheral surface of the disk 301 in the circumferential direction at positions corresponding to the semi-spherical projections 304. An elastic rubber body 305 is interposed between the inner peripheral surface of each semi-spherical projection 304 of the rim 302 and the outer peripheral surface of each semi-spherical projection 303 of the disk 301 to join the disk 301 to the rim 302. A plurality of such joints, preferably 3 to 24, more preferably 8 to 16 in number, are arranged at opposite positions with respect to the wheel axle to ensure strength of the joints. The discontinuous arrangement of the joints in the circumferential direction ensures the mechanical safety of the wheel in the radial direction, axle direction, and circumferential direction, thereby preventing serious problems such as coming off of the rim. The curvatures of the projections 303 and 304 are properly selected depending on the size of the tire, and the thickness of the elastic rubber body 305 in the radial direction of the wheel is properly selected depending on the type of the tire in order to improve riding comfortablesess performance, vibrationproof performance and soundproof performance, without sacrificing the durability and safety.

Next, in another embodiment of this type, the wheel has the same construction as the one shown FIG. 15 when viewed in the cross-section taken along the axle direction of the wheel. The embodiment is different from the previous one in that a series of semi-spherical recesses 7 are formed on the rim 302 in the circumferential direction in a spaced-apart manner, and a series of semi-spherical recesses 6 having a shape corresponding to the semi-spherical recess 7 are formed on the outer peripheral surface of the disk 301 in the circumferential direction at positions corresponding to the semi-spherical recess 7. As in the case with the embodiment above, an elastic rubber body 308 is interposed between the inner peripheral surface of each semi-spherical recess 7 and the outer peripheral surface of each semi-spherical recess 6 to join the disk 301 to the rim 302. The arrangement of the joints and the curvatures of the semi-spherical recesses are determined in the same manner as in the above-described embodiment.

The following are the results of the evaluation tests to evaluate the performances of one embodiment of the elastic wheel of the present invention.

An elastic wheel including an annular elastic rubber body with the construction shown in FIG. 1 was made to meet the conditions shown below. A tire with the size of 185/55R15 was mounted on the wheel and the wheel was evaluated for the vibration-absorbing property and the soundproof performance. Evaluations were made as described below:

(Rim)
  Size: 15 inches
  Width: 5.5 J (Elastic Rubber Body)
  Proportion of empty space (gap): 15%
  JIS-A Hardness: 60°
  Elasticity modulus: $4 \times 10^4$ N/cm$^2$ (Vibration-Absorbing Property)
  Using an acceleration sensor, the magnitude of the force exerted on the wheel axle mounted on an automobile was measured while the automobile was actually driven.

(Noise-Suppression Property)
  Using a microphone placed on a headrest of a driver's seat of an automobile, the sound pressure was measured while the automobile was actually driven.

The results of the test for the vibration-absorbing property showed that the elastic wheel of the above-described embodiment was capable of absorbing vibration under small input load conditions while prevented from undergoing substantial deformation under large input load conditions. Accordingly, this embodiment of the elastic wheel of the present invention can improve riding comfortablesess performance, vibrationproof performance and soundproof performance, regardless of whether the input load is small or large, without sacrificing durability and safety. Also, the embodiment has proven significantly effective in suppressing high-frequency noises of 100 Hz or higher in the test for the noise-suppression property. The other embodiments of the elastic wheel have proven equally effective.

Figure 17:
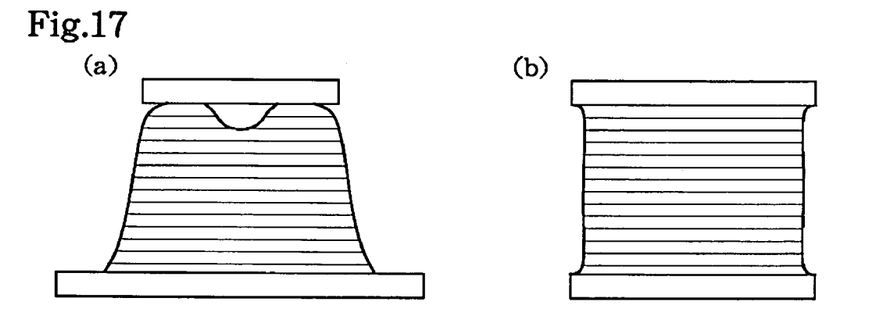
FIG. 17 is a cross-sectional view showing an elastic rubber body interposed between plates.

Next, a comparison was made for variation in the spring constant between the wheel (a) in FIG. 17, in which a gap is formed between the elastic rubber body and the inner peripheral surface of the rim, and the wheel (b) in FIG. 17, in which no gap is formed. The same elastic rubber body was used and the height (i.e., distance between the plates)

selected to be 20 mm in both of the wheels (a) and (b) in FIG. 17. As can be seen, the elastic rubber body has a substantially constant width over the distance between the plates in the wheel (b), whereas the rubber body interposed between the plates in the wheel (a) has two bumps formed at the top thereof, leaving a gap (proportion of the gap: 15%) between the bumps.

Figure 18:
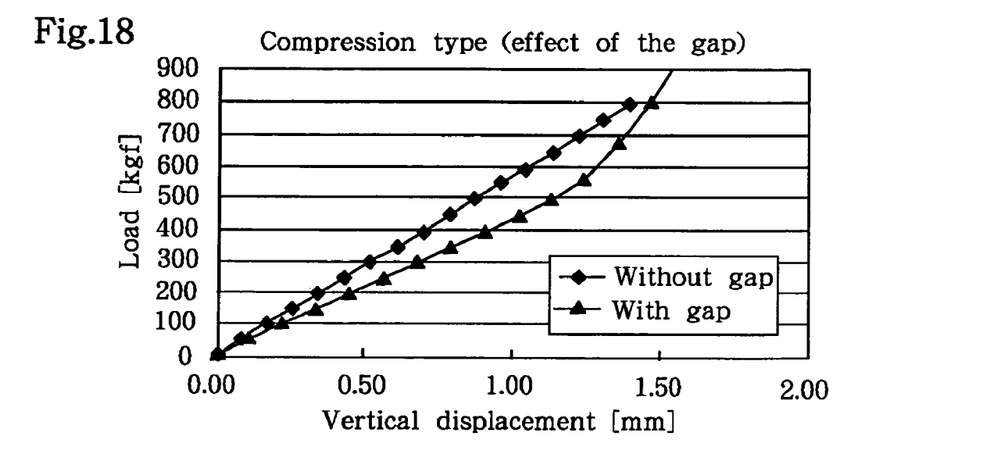
FIG. 18 is a graph showing the relationship between the amount of displacement in a vertical direction of the elastic rubber body in FIG. 17 and applied load.

Varying loads were applied from above to the wheels (a) and (b), and the correlation between the amount of the vertical displacement and the load was examined. The results are shown in FIG. 18. As can be seen from the graph in FIG. 18, the wheel (a) has a smaller spring constant in the vertical direction as compared to the wheel (b) under small input conditions and thus has a higher anti-vibration ability, whereas it has a larger spring constant in the vertical direction as compared to the wheel (b) under large input conditions and thus has a higher stability.

INDUSTRIAL APPLICABILITY

As has been described thus far, the elastic wheels of the present invention improve riding comfortablesess performance, vibrationproof performance as well as soundproof performance, regardless of whether the input load is small or large, without sacrificing durability and safety.

What is claimed is:

1. An elastic wheel comprising:
an outer rim for supporting a tire;
a disk with a base rim positioned radially inward of the outer rim; and
means for defining an annular gap at a radially intermediate position between the outer rim and the base rim;
wherein the entire outer rim is positioned radially further from the base rim than the entire annular gap defining means, and
the annular gap defining means comprises an elasticity-providing device inserted between an outer peripheral surface of the base rim and an inner peripheral surface of the outer rim, the device including two concentrically arranged annular members with different diameters and a single annular elastic rubber body arranged between an outer peripheral surface of the inner annular member and an inner peripheral surface of the outer annular member, and wherein the elastic rubber body, in a cross-section taken along an axle direction of the wheel, has a width that gradually varies from the outer peripheral surface of the base rim toward the inner peripheral surface of the outer rim.

2. The elastic wheel according to claim 1, wherein the annular gap is formed between the elastic rubber body and the outer peripheral surface of the base rim or the inner peripheral surface of the outer rim.

3. The elastic wheel according to claim 2, wherein the gap accounts for 5 to 80% of a space accommodating the elastic rubber body in the cross-section of the elastic rubber body in an axle direction of the wheel.

4. The elastic wheel according to claim 3, wherein the gap accounts for 10 to 70% of a space accommodating the elastic rubber body in the cross-section of the elastic rubber body in the axle direction of the wheel.

5. The elastic wheel according to claim 4, wherein the gap accounts for 10 to 50% of a space accommodating the elastic rubber body in the cross-section of the elastic rubber body in the axle direction of the wheel.

6. The elastic wheel according to claim 2,
wherein the elastic rubber body has a JIS-A hardness (Hd) of 30 to 80° and an elasticity modulus of $1 \times 10^3$ to $1 \times 10^5$ N/cm$^2$.

7. The elastic wheel according to claim 1, wherein the device includes the outer annular member on one side of the wheel in an axle direction and an annular support member arranged on the other side of the wheel.

8. An elastic wheel comprising:
a disk equipped with a base rim positioned radially inward of an outer rim for supporting a tire; and
an elasticity-providing device inserted between an outer peripheral surface of the base rim and an inner peripheral surface of the outer rim, the elasticity-providing device including
an inner annular member concentrically arranged with an outer annular member, the inner and the outer annular members having different diameters, and
an elastic rubber body arranged between an outer peripheral surface of the inner annular member and an inner peripheral surface of the outer annular member;
wherein the elastic rubber body extends in a wheel width direction over a center portion of the base rim, such that an annular gap is formed in the circumferential direction between the elastic rubber body and only one of the inner annular member and the outer annular member.

9. The elastic wheel according to claim 8, wherein the gap accounts for 5 to 80% of a space accommodating the elastic rubber body in the cross-section of the elastic rubber body in an axle direction of the wheel.

10. The elastic wheel according to claim 9, wherein the gap accounts for 10 to 70% of a space accommodating the elastic rubber body in the cross-section of the elastic rubber body in the axle direction of the wheel.

11. The elastic wheel according to claim 10, wherein the gap accounts for 10 to 50% of a space accommodating the elastic rubber body in the cross-section of the elastic rubber body in the axle direction of the wheel.

12. The elastic wheel according to claim 8,
wherein the elastic rubber body has a JIS-A hardness (Hd) of 30 to 80° and an elasticity modulus of $\times 10^3$ to $1 \times 10^5$ N/cm$^2$.

* * * * *